United States Patent Office 3,494,962
Patented Feb. 10, 1970

3,494,962
ARYL-SUBSTITUTED ALIPHATIC AMINE OXIDES
Eugene J. Miller, Jr., Wheaton, and Harlan E. Tiefenthal, Western Springs, Ill., assignors, by mesne assignments, to Armour Industrial Chemical Company, a corporation of Delaware
No Drawing. Filed Nov. 2, 1966, Ser. No. 591,403
Int. Cl. C07c 87/28; A61k 7/06
U.S. Cl. 260—570.8                       9 Claims

ABSTRACT OF THE DISCLOSURE

Aryl-substituted aliphatic amine oxide compounds having substituted on a nitrogen atom at least 1 long chain alkyl group having an aryl group attached to an internal carbon atom thereof, useful as surface active agents and as components of shampoos and detergent formulations.

---

This invention relates to a novel class of aryl-substituted aliphatic amine oxides and process for their production, and more particularly this invention relates to amine oxides containing at least one long chain aliphatic group to which an aryl group is attached as a side chain, thereby providing an aralkyl group. The compounds may contain one or two amine oxide groups. The compounds of this invention have utility as surface active agents, foam boosters, stabilizers, and as components of shampoos and detergent formulations.

The amine oxide compounds of the present invention can be represented by the following structural formula:

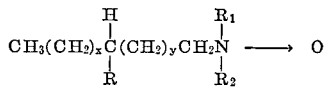

wherein $x$ and $y$ are integers from 0 to 19 and the total of $x$ and $y$ is an integer from 8 to 19, and R is an aryl group selected from phenyl, naphthyl, and phenyl substituted with from 1 to 2 groups selected from methyl, hydroxy, methoxy and phenoxy. In a preferred subclass of compounds $x$ and $y$ are integers from 0 to 15, and the total of $x$ and $y$ is 15.

It will be noted from the foregoing formula that the amine oxide compounds contain at least one long chain aryl-substituted aliphatic group, or, more specifically, an aralkyl group. In one embodiment, the alkyl portion of the aralkyl group contains a total of 18 carbons. In other embodiments, the alkyl portion of the aralkyl groups can contain 11, 16 or 22 carbons. More generally, the total of $x$ and $y$ (which is three less than the total of carbons in the alkyl portion of the aralkyl) may range from 8 to 19.

$R_1$ and $R_2$ are selected from (1) alkyls of 1 to 3 carbons; (2) —$(CH_2CH_2O)_pH$ for $R_1$ and

—$(CH_2CH_2O)$ for $R_2$;

(3) 

(4) 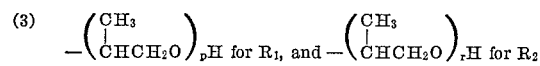

for $R_2$ where $R_1$ is selected from (A) alkyls of 1 to 3 carbons, (B) —$(CH_2CH_2O)_pH$, and (C)

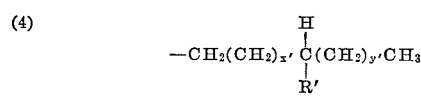

and (5)

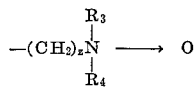

for $R_2$ where $R_1$, $R_3$, and $R_4$ are selected from (A) alkyls of 1 to 3 carbons, (B) —$(CH_2CH_2O)_mH$ for $R_1$, —$(CH_2CH_2O)_wH$ for $R_3$ and —$(CH_2CH_2O)_sH$ for $R_4$ and (C) 

for $R_3$, and

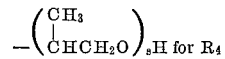

The letters $p$ and $r$ are integers from 1 to 40 with the total of $p$ plus $r$ not exceeding 60. In a preferred subclass, $p$ and $r$ are integers from 1 to 20 with the total of $p$ plus $r$ not exceeding 30.

The letters $m$, $w$, and $s$ are integers from 1 to 40 with the total of $m$ plus $w$ plus $s$ not exceeding 80. In a preferred subclass, $m$, $w$, and $s$ are integers from 1 to 20 with the total of $m$ plus $w$ plus $s$ not exceeding 50.

The letters $x'$ and $y'$ are each an integer as defined for $x$ and $y$ above.

The letter R' is selected from R as defined above and H.

The letter $z$ is an integer from 2 to 6. In a preferred subclass, $z$ is equal to 3.

In another preferred subclass of the above compounds, $R_1$ and $R_2$ are methyl. $R_1$ and $R_2$ may also be ethyl or propyl.

The carbon to which the aryl group is attached varies with the respective values of $x$ and $y$. With unsaturated alkylene chains, such as oleyl, under most reaction conditions the double bond migrates up and down the chain (isomerization by hydrogen ion transfer) resulting in a mixture of isomeric products. In arylating oleyl, there is a tendency for the $C_8$–$C_{14}$ and the $C_{17}$ aryl isomers to predominate, but smaller mole percentages of other isomers, such as the $C_6$, $C_7$, $C_{15}$ and $C_{16}$ isomers are also produced. The mole percent of the $C_2$–$C_5$ isomers is usually quite small or even negligible. The relative proportions of the various isomers may vary depending on the arylation process. See J. Org. Chem. 30, 885–888 (1965). However, the total of $x$ and $y$ will remain constant for the particular substituted chain, viz. 15 for stearyl, 8 for undecyl, 19 for behenyl, etc. By arylation, oleic acid is converted to aryl-substituted stearic acid. Similarly, palmitoleic, erucic, and 10-undecenoic acids can be converted to the corresponding aryl-substituted carboxylic acids. Ordinary commercial grade oleic acid contains several percent of palmitoleic acid, and therefore a mixture of aryl-substituted stearic and palmitic acids is obtained by arylation.

Among the preferred aryl substituents on the aliphatic group are phenyl, hydroxyphenyl, tolyl, anisyl, and naphthyl. The phenyl nucleus may be substituted with 1 or 2 groups such as methyl, hydroxy, methoxy and phenoxy. Examples of aryl substituents coming with this subclass are cresyl, resorcyl, and xylyl.

The amine oxide compounds of our invention may be formed from arylaliphatic tertiary amines. Such arylaliphatic tertiary amines may be derived from an unsaturated aliphatic acid.

Aryl fatty acids, such as arylstearic acid or arylpalmitic acid, may be prepared by the arylation of the corresponding unsaturated fatty acid (e.g., oleic acid or palmitoleic acid.) A catalyst is ordinarily required for such arylation, as is well known in the art. For example, aluminum chloride may be employed as the catalyst. With this process, the fatty acid is preferably first converted to the cyano or nitrile derivative, which is then reacted with the arylating agent in the presence of aluminum chloride. The aryl cyanoaliphatic compound can then be reduced to the corresponding primary amine by hydrogenation in the presence of a catalyst such as Raney nickel.

For direct arylation of unsaturated acids other catalysts are preferred, such as acid activated clays, or hydrofluoric acid. A process employing an activated clay is described in U.S. Patent 3,074,983, while use of hydrofluoric acid is described in U.S. Patent 2,275,312. An improved process utilizing hydrofluoric acid is described and claimed in the copending application, Serial No. 451,021, filed Apr. 26, 1965, and now abandoned, entitled "Process for Arylating Unsaturated Fatty Compounds." The compounds arylated by this process are suitable for use in the preparation of the amine oxides of this invention.

Reference to a specific example illustrating the synthesis of an arylaliphatic primary amine follows:

EXAMPLE I

Phenylstearic acid was prepared from commercial grade oleic acid which contained a few percent of palmintoleic acid by a Friedel-Crafts reaction using hydrofluoric acid as the catalyst and benzene as the arylating agent. Thereafter, phenylstearonitrile was prepared on a continuous nitrile unit over bauxite cataylst at 280–300° C. from 1127 gms. of phenylstearic acid. A crude yield of 833.5 gms. of phenylstearonitrile was obtained comprising a mixture of isomers with respect to location of the phenyl group, predominately the $C_8$ to $C_{14}$, and the $C_{17}$ isomers with lesser proportions of other isomers.

Phenylstearonitrile (591 gms.) was reduced in a 1-liter, Parr autoclave over 2% (by wt.) alcohol washed Raney nickel catalyst in the presence of ammonia (150 p.s.i. at 30–40° C.) and hydrogen (800 p.s.i. total pressure at 125° C.) for 4–5 hours. The product was obtained as a light amber oil, 582.3 gms. (97% crude yield). Phenyloctadecylamine was obtained in 67% yield upon distillation at 183–190° C. at 0.3 mm.

Di-arylaliphatic secondary amines may be obtained from arylaliphatic nitriles by reduction under hydrogen pressure at about 200° C. in the presence of Raney nickel. These compounds and the process for their production are described in our copending application, Ser. No. 585,751, filed Oct. 11, 1966, entitled "Aryl-Substituted Aliphatic Secondary Amines." All of the di-arylaliphatic secondary amines described in this patent application are among the suitable reactants to form the tertiary amines from which to prepare the amine oxides of our invention. Reference to a specific example illustrating the synthesis of a di-aryliphatic secondary amine follows:

EXAMPLE II

A one-liter Magne-dash autoclave was charged with 552.3 gms. (1.62 moles) phenyloctadecylnitrile and 19.6 gms. (3% by wt.) copper chromite catalyst. The reactor was flushed with hydrogen and the temperature raised to 195° C. Hydrogen pressure was maintained at 200 p.s.i.g. with continuous bleeding and the temperature maintained at about 195–200° C. After 28 hours of reaction, the mixture was cooled and filtered to yield 525.1 gms. (96.2% mass yield) of viscous amber oil, analyzed as follows:

Neutralization equivalent _____(calc'd. 674)__ 710
Primary amine _____ nil
Di-(phenyloctadecyl) amine _____percent__ 93.7
Tertiary amine _____do____ 2.7

Arylaliphatic diamines suitable for reactants to form tertiary amines from which to prepare the di-amine oxides of our invention are those formed from primary arylaliphatic amines by cyanoalkylation followed by reduction as described in copending application, Ser. No. 500,359, filed Oct. 21, 1965, and now abandoned, entitled "Aryl-Substituted Aliphatic Diamine Compounds." All of the arylaliphatic diamine compounds described in this patent application are among the suitable starting materials to produce the tertiary amines from which to prepare the di-amine oxides of our invention. A specific example illustrating the preparation of such a diamine compound follows:

EXAMPLE III

Acrylonitrile (61.0 gms., 1.15 moles) was added slowly over 2 hours, with stirring, to phenyloctadecylamine prepared as described in Example I (363.8 gms., 1.05 moles) and 17.0 gms. water at 60–70° C. The resulting mixture was then stirred at 70–80° C. for 4 additional hours. The water was separated and the product, N-(beta-cyanoethyl) phenyloctadecylamine, was dried under reduced pressure at 60–70° C. Analysis of the product showed:

Neutralization equivalent ___(calc'd. 398.6)__ 401
Primary amine _____ nil
Secondary amine _____percent__99.5

The N-(beta-cyanoethyl) phenyloctadecylamine was reduced in the presence of 1% alcohol washed Raney nickel, ammonia (125 p.s.i. at 40° C.) and hydrogen (800 p.s.i. total pressure) at 135° C. in 6–7 hours, thereby obtaining N - (gamma-aminopropyl) phenyloctadecylamine. The product was a mixture of isomers containing primarily the $C_8$ to $C_{14}$ and the $C_{17}$ isomers, analyzing as follows:

Neutralization equivalent ____(calc'd. 201.3)__ 201
Primary amine _____percent__ 53.4
Secondary amine _____do____ 45.5

Aryl-substituted aliphatic primary and secondary amines can be converted to corresponding mono-tertiary amines, and aryl-substituted aliphatic diamines can be converted to corresponding di-tertiary amines by alkylation or alkoxylation as described in copending application, Ser. No. 590,474, filed Oct. 31, 1966, entitled "Aryl-substituted Aliphatic Tertiary Amines." All of the tertiary amine compounds described in this patent application are among suitable reactants to form the amine oxides of our invention.

The alkylated arylalkyl tertiary amines can be prepared by reductive alkylation of the above-mentioned arylaliphatic amines with aldehydes in the presence of a hydrogen source and heat from about 50–150° C. When hydrogen is supplied directly, a hydrogenation catalyst such as Raney nickel is preferably employed. An example of a chemical hydrogen source is formic acid.

The alkoxylated arylakyl tertiary amines can be prepared by reacting the above-mentioned arylaliphatic amines with an alkylene oxide at about 50–200° C. and a pressure of about 0–100 p.s.i.g. Preferably the reaction temperature is from about 100–150° C. and pressure preferably less than 50 p.s.i.g. For example, the amine can be reacted with ethylene oxide or propylene oxide and it is understood that the ethylene or propylene oxide for reaction with the amine will distribute between the $R_1$, and $R_2$ groups, and in case of the diamine will distribute between the $R_1$, $R_3$ and $R_4$ groups in adduct formation.

A specific example illustrating the preparation of a tertiary amine compound follows:

EXAMPLE IV

A 300-ml. stainless steel, stirred autoclave was charged with phenylstearylamine (97.3 gms., 0.284 moles), glacial acetic acid (1 ml.) and Raney nickel catalyst (2 gms. alcohol washed). The temperature was raised to 115° C. and hydrogen added under pressure to 175 p.s.i. while maintaining a continuous vent. Formacel (45–55% solution of formaldehyde in methanol) was then pumped in slowly. At 8 ml., 17 ml., 24 ml., and 30 ml. of Formacel added, the pumping was stopped and the vessel vented to 0 p.s.i. After 30 ml. of Formacel had been added, a sample was analyzed and 0.5 ml. additional Formacel was added to complete the reaction. The reaction mixture was filtered to give crude N,N-dimethyl phenylstearylamine in 90.5% yield. Distillation afforded the tertiary amine in 68.7% yield having the following analysis:

Neutralization equivalent (calc'd. 373) _____ 372
Primary amine _____percent__ 1.38
Secondary amine _____do____ 1.44
Tertiary amine _____do____ 97.2

The mono- and di-amine oxides of our invention can be produced by reaction of aryl-substituted aliphatic tertiary amines represented by the formula

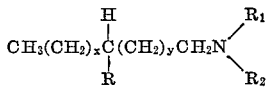

wherein $x$ and $y$ are integers from 0 to 19 and the total of $x$ and $y$ is an integer from 8 to 19; R is an aryl group selected from phenyl, naphthyl, and phenyl substituted with from 1 to 2 groups selected from methyl, hydroxy, methoxy, and phenoxy; $R_1$ and $R_2$ are selected from (1) alkyls of 1 to 3 carbons; (2) —$(CH_2CH_2O)_pH$ for $R_1$ and —$(CH_2CH_2O)_rH$ for $R_2$;

(3) 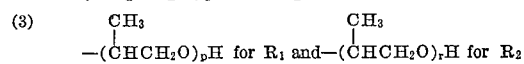

(4) 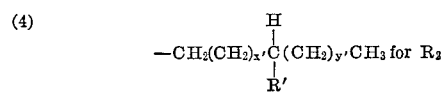

where $R_1$ is selected from (A) alkyls of 1 to 3 carbons, (B) —$(CH_2CH_2O)_pH$, and (C) 

and (5) —$(CH_2)_zNR_3R_4$ for $R_2$ where $R_1$, $R_3$, and $R_4$ are selected from (A) alkyls of 1 to 3 carbons, (B) —$(CH_2CH_2O)_mH$ for $R_1$, —$CH_2CH_2O)_wH$ for $R_3$, and —$(CH_2CH_2O)_sH$ for $R_4$, and (C) 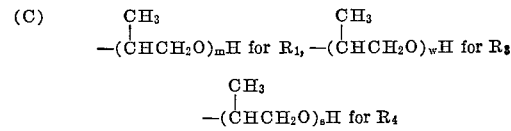

and wherein $p$ and $r$ are integers from 1 to 40 with the total of $p$ plus $r$ not exceeding 60, $m$, $w$, and $s$ are integers from 1 to 40 with the total of $m$ plus $w$ plus $s$ not exceeding 80, $x'$ and $y'$ are integers as defined for $x$ and $y$ above, R' is selected from R and H, and $z$ is an integer from 2 to 6; with hydrogen peroxide at temperature of from about 20° to 50° C. It is preferred to slowly add hydrogen peroxide to the tertiary amine which is in a solvent such as water or alcohol and maintaining the reaction mixture at about 20° to 50° C. until the reaction is substantially completed.

This invention is further illustrated by the following specific examples. From what has been said above, it will be understood that the products of the examples are in the form of isomeric mixtures.

EXAMPLE V

A 300 ml. three neck flask, equipped with a thermometer, reflux condenser, addition funnel and magnetic stirrer, was charged with 55.2 g. (0.2 mole) of N,N-dimethylphenylundecylamine and 55.2 g. of 50% aqueous isopropanol. Hydrogen peroxide (7.6 g., 48.9% active, 0.1 mole) was added slowly, over 45 minutes, at 27–30° C. The temperature was then raised to 40–47° C. and an additional 7.6 g. (48.9% active, 0.1 mole) of hydrogen peroxide was added over 40 minutes. The reaction mixture was then stirred at 40° C. overnight. The amine oxide, being N,N-dimethylphenylundecylamine oxide, was obtained as an aqueous isopropanol solution having the following analysis:

Percent
Amine oxide _____ 42.8
Free amine _____ 0.22

EXAMPLE VI

A 200 ml. three neck flask, equipped with a thermometer, reflux condenser, addition funnel and magnetic stirrer, was charged with 21.6 g. (0.05 mole) of N,N-dimethylphenyldocosylamine and 21.6 g. of 50% aqueous isopropanol. Hydrogen peroxide (1.9 g., 48.9% active, 0.025 mole) was added in two minutes at 21° C. The temperature was then raised to 42° C. and an additional 1.9 g. (48.9% active, 0.025 mole) of hydrogen peroxide was added in five minutes. The reaction mixture was then stirred at 44° C. overnight. The amine oxide, being N,N-dimethylphenyldocosylamine oxide, was obtained as an aqueous isopropanol solution having the following analysis:

Percent
Amine oxide _____ 44.2
Free amine _____ 2.1
Free $H_2O_2$ _____ 0.68

EXAMPLE VII

A 250 ml. three neck flask, equipped with a thermometer, reflux condenser, addition funnel and magnetic stirrer, was charged with 73.4 g. (0.16 mole) of N,N-di-(beta-hydroxyethyl) tolyloctadecylamine and 50 ml. of 50% aqueous isopropanol. Hydrogen peroxide (17.9 g., 0.176 mole) was added over a one hour period at 30–35° C. and the resulting mixture was refluxed overnight. The resulting N,N,-di-(beta-hydroxyethyl) tolyloctadecylamine oxide was obtained in aqueous alcohol solution having the following analysis:

Percent
Amine oxide _____ 48.3
Free amine _____ 1.3
Free $H_2O_2$, _____ 3.4

EXAMPLE VIII

A 250 ml. three neck flask, equipped with a reflux condenser, addition funnel, thermometer and magnetic stirrer, was charged with 62.5 g. (0.155 mole) of N,N-dimethyl tolyloctadecylamine, 20.4 g. of water and 32.5 g. of isopropanol. The mixture was heated to 58° C., with stirring, and 5.55 g. (0.163 mole, 31.4% active) of hydrogen peroxide was added over a 30 minute period. The resulting mixture was stirred for an additional hour at 65–75° C., then overnight at room temperature. One additional ml. of hydrogen peroxide was then added and the reaction mixture heated to 65–75° C. for an additional hour. The amine oxide, being N,N-dimethyl tolyloctadecylamine oxide, was obtained as an aqueous isopropanol solution having the following analysis:

Percent
Amine oxide _____ 47.0
Free amine _____ Nil
Free $H_2O_2$ _____ 1.7

EXAMPLE IX

A 250 ml. two neck flask, equipped with a thermometer reflux condenser, addition funnel and magnetic stirrer was charged with 36.1 g. (0.055 mole) of N-methyl-N,N-di-phenyloctadecylamine and 34 g. of 50% aqueous isopropanol. Hydrogen peroxide (4.11 g., 0.11 mole, 50% active) was added in 15 minutes at room temperature. The mixture was then stirred overnight at 30–35° C. Analysis of the reaction mixture at this point showed only 12.7% amine oxide present. An additional 2.27 ml. of 50% hydrogen peroxide was then added at 45° C. and the temperature raised to 65° C. for one hour. The amine oxide, N-methyl-N,N-di-phenyloctadecyl amine-oxide, was obtained as an aqueous isopropanol solution having the following analysis:

|  | Percent |
| --- | --- |
| Amine oxide | 38.6 |
| Free amine | 3.5 |
| Free $H_2O_2$ | 1.5 |

We claim:

1. Aryl-substituted aliphatic amine oxides represented by formula $$CH_3(CH_2)_x\overset{H}{\underset{R}{C}}(CH_2)_yCH_2\overset{R_1}{\underset{R_2}{N}} \longrightarrow O$$

wherein $x$ and $y$ are integers from 0 to 19 and the total of $x$ plus $y$ is an integer from 8 to 19; R is an aryl group selected from phenyl, naphthyl, and phenyl substituted with from 1 to 2 groups selected from methyl, hydroxy, methoxy and phenoxy; and $R_1$ and $R_2$ are selected from (1) alkyls of 1 to 3 carbons, (2) —$(CH_2CH_2O)_pH$ for $R_1$ and —$(CH_2CH_2O)_rH$ for $R_2$, (3) $-\left(\underset{CHCH_2O}{\overset{CH_3}{|}}\right)_pH$ for $R_1$ and $-\left(\underset{CHCH_2O}{\overset{CH_3}{|}}\right)_rH$ for $R_2$ (4) $$-CH_2(CH_2)_{x'}\overset{H}{\underset{R'}{C}}(CH_2)_{y'}CH_3 \text{ for } R_2$$

where $R_1$ is selected from (A) alkyls of 1 to 3 carbons, (B) —$(CH_2CH_2O)_pH$, and (C) $-\left(\underset{CHCH_2O}{\overset{CH_3}{|}}\right)_pH$ and (5) $$-(CH_2)_z\overset{R_3}{\underset{R_4}{N}} \longrightarrow O$$

for $R_2$ where $R_1$, $R_3$, and $R_4$ are selected from (A) alkyls of 1 to 3 carbons, (B) —$(CH_2CH_2O)_mH$ for $R_1$, —$(CH_2CH_2O)_wH$ and $R_3$, and —$(CH_2CH_2O)_sH$ for $R_4$ and (C)

$-\left(\underset{CHCH_2O}{\overset{CH_3}{|}}\right)_mH$ for $R_1$, $-\left(\underset{CHCH_2O}{\overset{CH_3}{|}}\right)_wH$ for $R_3$ and $-\left(\underset{CHCH_2O}{\overset{CH_3}{|}}\right)_sH$ for $R_4$ and wherein $p$ and $r$ are integers from 1 to 40 with the total of $p$ plus $r$ not exceeding 60, $m$, $w$, and $s$ are integers from 1 to 40 with the total of $m$ plus $w$ plus $s$ not exceeding 80, $x'$ and $y'$ are each an integer as defined for $x$ and $y$ above, R' is selected from R and H, and $z$ is an integer from 2 to 6.

2. The compounds of claim 1 wherein $x$ and $y$ are integers from 0 to 15 and the total of $x$ and $y$ is 15.

3. The compounds of claim 1 wherein R is phenyl.

4. The compounds of claim 3 wherein $R_1$ is —$(CH_2CH_2O)_pH$ and $R_2$ is —$(CH_2CH_2O)_rH$ wherein $p$ and $r$ are integers from 1 to 20 with the sum of $p$ and $r$ not exceeding 30.

5. Aryl-substituted aliphatic amine oxides represented by the formula $$CH_3(CH_2)_x\overset{H}{\underset{R}{C}}(CH_2)_yCH_2\overset{R_1}{\underset{R_2}{N}} \longrightarrow O$$

wherein $x$ and $y$ are integers from 0 to 19 and the total of $x$ plus $y$ is an integer from 8 to 19; and R is an aryl group selected from phenyl, naphthyl, and phenyl substituted with from 1 to 2 groups selected from methyl, hydroxy, methoxy, and phenoxy; and $R_1$ and $R_2$ are selected from (1) alkyls of 1 to 3 carbons, and (2) —$(CH_2CH_2O)_pH$ for $R_1$ and —$(CH_2CH_2O)_rH$ for $R_2$ and (3)

$-\left(\underset{CHCH_3O}{\overset{CH_3}{|}}\right)_pH$ for $R_1$, and $-\left(\underset{CHCH_2O}{\overset{CH_3}{|}}\right)_rH$ for $R_2$, and wherein $p$ and $r$ are integers from 1 to 40 with the total of $p$ plus 4 not exceeding 60.

6. The compounds of claim 5 wherein R is phenyl and $R_1$ and $R_2$ are each methyl.

7. The compounds of claim 5 wherein R is phenyl, $R_1$ is —$(CH_2CH_2O)_pH$ and $R_2$ is —$(CH_2CH_2O)_rH$ wherein $p$ and $r$ are integers from 1 to 20 with the sum of $p$ and $r$ not exceeding 30, and the sum of $x$ and $y$ is 15.

8. Aryl-substituted aliphatic amine oxides represented by the formula $$CH_3(CH_2)_x\overset{H}{\underset{R}{C}}(CH_2)_yCH_2\overset{R_1}{\underset{R_2}{N}} \longrightarrow O$$

wherein $x$ and $y$ are integers from 0 to 19 and the total of $x$ plus $y$ is an integer from 8 to 19; R is an aryl group selected from phenyl, naphthyl, and phenyl substituted with from 1 to 2 groups selected from methyl, hydroxy, methoxy, and phenoxy; and $R_2$ is $$-(CH_2)_z\overset{R_3}{\underset{R_4}{N}} \longrightarrow O$$

and $R_1$, $R_3$, and $R_4$ are selected from (A) alkyls of 1 to 3 carbons (B) —$(CH_2CH_2O)_mH$ for $R_1$, —$(CH_2CH_2O)_wH$ for $R_3$, —$(CH_2CH_2O)_sH$ for $R_4$ and (C)

$-(\overset{CH_3}{\underset{|}{C}}HCH_2O)_mH$ for $R_1$, $-(\overset{CH_3}{\underset{|}{C}}HCH_2O)_wH$ for $R_3$, and $-(\overset{CH_3}{\underset{|}{C}}HCH_2O)_sH$ for $R_4$, wherein $m$, $w$, and $s$ are integers from 1 to 40 with the total of $m$ plus $w$ plus $s$ not exceeding 80, and $z$ is an integer from 2 to 6.

9. Aryl-substituted aliphatic amine oxides represented by the formula $$CH_3(CH_2)_x\overset{H}{\underset{R}{C}}(CH_2)_yCH_2\overset{R}{\underset{R}{N}} \longrightarrow O$$

wherein $x$ and $y$ are integers from 0 to 19 and the total of $x$ plus $y$ is an integer from 8 to 19; R is an aryl group selected from phenyl, naphthyl, and phenyl substituted with from 1 to 2 groups selected from methyl, methoxy and phenoxy; and $R_2$ is $$-CH_2(CH_2)_{x'}\overset{H}{\underset{R}{C}}(CH_2)_{y'}CH_3$$

and $R_1$ is selected from (A) alkyls of 1 to 3 carbons, (B) —$(CH_2CH_2O)_pH$, and (C)
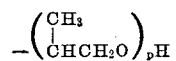
wherein $x'$ and $y'$ are each an integer as defined for $x$ and $y$ above, $R'$ is selected from $R$ and $H$, and $p$ is an integer from 1 to 40.
References Cited
UNITED STATES PATENTS
2,169,976  8/1939  Guenther et al. _____ 260—561
ROBERT V. HINES, Primary Examiner
U.S. Cl. X.R.
252—117, 357, 380; 260—413, 465; 424—70